F. L. KIRTLEY.
Hay and Cotton Presses.

No. 153,349. Patented July 21, 1874.

WITNESSES:
G. Mathys
Edw. V. Benton

INVENTOR:
F. L. Kirtley
BY
ATTORNEYS.

UNITED STATES PATENT OFFICE.

FIELDING L. KIRTLEY, OF CLEBURNE, TEXAS.

IMPROVEMENT IN HAY AND COTTON PRESSES.

Specification forming part of Letters Patent No. 153,349, dated July 21, 1874; application filed July 3, 1874.

*To all whom it may concern:*

Be it known that I, FIELDING L. KIRTLEY, of Cleburne, in the county of Johnson and State of Texas, have invented a new and Improved Hay and Cotton Press; and I do hereby declare that the following is a full, clear, and exact description of the same, reference being had to the accompanying drawing, forming a part of this specification, in which—

Figure 1:
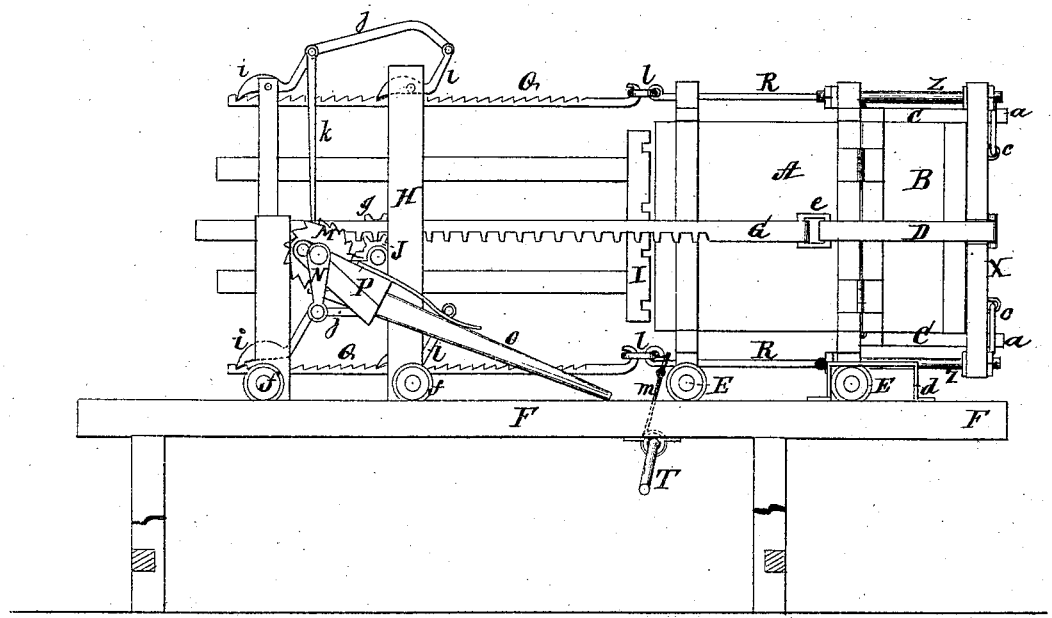
Figure 2:
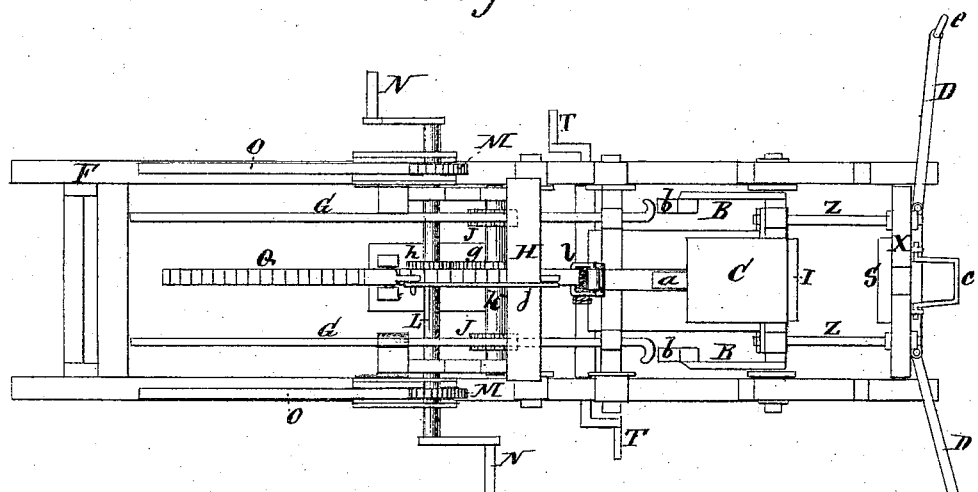

Figure 1 is a side elevation; Fig. 2, a plan view.

This invention relates to that class of machines which are used for pressing hay, cotton, &c., into bales. It consists in a strong, substantial box for the purpose of holding the material to be pressed, provided with doors opening on all sides of the portion of the box into which the bale is compressed. Said box is mounted upon rollers upon a frame-work, one set of which are contained within a pair of keepers, which allow the box to turn upon the same and assume a vertical position when the box is to be filled. Securely attached to the box are metallic straps, provided with links, one set of which engage with a ratchet-toothed bar above and below, and the other set with a rack on each side of the apparatus. Said rack is contained within a frame-work mounted upon rollers, and moving upon a level with and upon the same supporting-frame as the box. In the same frame with the rack is a shaft bearing pinions, which engage with the racks, said shaft being driven through cog-wheels by a second shaft, which is actuated by a spring-seated lever that engages with a ratchet-wheel made fast to said shaft. As these levers are operated this movable frame is advanced, and a follower-block, which is attached to the same, is forced into the box, there compressing the material contained therein into a bale.

In the drawing, A represents a strongly-braced box, having the side doors B B and the vertically-moving doors C C, which open into the portion of the box into which the bale is compressed. Said doors are provided with the extensions $a\ a$ and $b\ b$, which fit into slots in the head-piece X, and are locked therein—$a\ a$ by the loops $c\ c$, and $b\ b$ by the hinged straps D D. Said head-piece X is securely fastened to the frame of box A by means of the stay-rods Z, and the box is mounted upon rollers E E, which rest upon a supporting-frame, F; one set of said rollers being contained within the keepers $d\ d$, which allow the box to be tilted when it is to be filled. Straps E are provided with links $e$, which fasten into the hooked ends of the racks G G. Said racks are contained within a frame, H, which moves over the frame F upon rollers $f$, and to which is attached the follower-block I. Meshing with the racks G are the pinions J J upon a shaft, K, which is connected by means of the cog-wheels $g$ and $h$ with a second shaft, L. Said shaft L has upon it the cranks N and the heavy ratchet-wheels M, which are operated by the hand-levers O, fulcrumed in the loosely-moving spring-seats P. In the top and bottom of the frame H are the ratchet-toothed bars Q Q, having the pawls $i$ and the connecting-rods $j\ k$. Said bars are hooked at their ends and fastened into the links $l$ of the straps R R, attached to the box A, and serve to hold the follower-block I tight up against the bale in compression, while the racks are being run back by the cranks N. The head-block S is made to correspond with the follower-block I, both having transverse grooves to facilitate the passage of the wire around the bale. Underneath the frame F is a windlass, T, having a rope, $m$, attached to the bottom of the box A, whereby the tilting of the box is regulated.

The operation of this press for baling cotton is as follows: The doors B and C being securely fastened, the box is tilted into a vertical position and allowed to rest upon a temporary support; the box is then filled and packed, either in the usual way, or by means of a ram operated by a block and fall, which latter method I prefer, as it more completely effects the packing, and does not knot and tangle the lint, nor introduce any foreign matter into the same. The box being filled, it is restored to its horizontal position by means of the windlass, and the links $e$ fastened into the hooked ends of the racks, and links $l$ into the hooked ends of bars Q. The cranks are now operated and the entire frame with follower-block drawn forward, the follower-block entering the box and partly compressing the cotton. The lever-arms are then worked alternately, and the frame gradually drawn forward upon the rollers by the pinion and rack, and the bale tightly compressed by the follower-block inside the box. The links $e$ are now thrown out and the racks run back by the cranks, the pawls $i$ serving to hold the follower-block tight against the bale. The doors B B are then opened, the wire bound around the bale, the pawls $i$ thrown out, the pressure removed, and the bale taken out. In constructing this machine I prefer to make the box A stationary and the frame H movable; but, as a modification of the machine, the frame may be made stationary and the box movable. The supporting-frame F is intended to be provided with attachments which will admit of the apparatus being placed upon a wagon-frame for transportation; or, if desired, may be constructed with wheels, the object being to render it sufficiently portable as to be readily carried from place to place.

Having thus described my invention, what I claim as new is—

1. The combination of the doors A A and B B, having the pieces $a\,a$ and $b\,b$, with the hinged straps D D and the loops $c\,c$, for the purpose of facilitating the binding of the bale, substantially as described.

2. The combination of the hinged straps D, having links $e$, with racks G, pinions J, ratchet-wheels M, hand-levers O, and spring-seats P, for the purpose of operating the follower-block, substantially as described.

3. The combination of the metallic straps R, having links $l$, with the ratchet-toothed bars Q, pawls $i$, and connecting-rods $j\,k$, for the purpose of maintaining the bale compressed when the connections with the racks are broken, substantially as described.

4. The combination of the apparatus A and H with the rollers E and $f$, and the supporting-frame F, substantially as and for the purpose described.

F. L. KIRTLEY.

Witnesses:
CHAS. A. PETTIT,
SOLON C. KEMON.